United States Patent
Schroff et al.

(10) Patent No.: US 7,840,713 B2
(45) Date of Patent: Nov. 23, 2010

(54) METHOD FOR OPERATING A FIELD BUS NETWORK SYSTEM HAVING A RING TOPOLOGY AND A CORRESPONDING FIELD BUS NETWORK SYSTEM

(75) Inventors: Clemens Schroff, Kraichtal (DE); Thomas Hogenmueller, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 11/904,718

(22) Filed: Sep. 28, 2007

(65) Prior Publication Data
US 2008/0082178 A1 Apr. 3, 2008

(30) Foreign Application Priority Data
Oct. 2, 2006 (DE) .................... 10 2006 046 841

(51) Int. Cl.
*G06F 15/16* (2006.01)
(52) U.S. Cl. .................................... 709/251
(58) Field of Classification Search ............... 370/231, 370/230, 229; 714/38, 48, 47; 710/4; 709/251
See application file for complete search history.

(56) References Cited
U.S. PATENT DOCUMENTS

| 6,360,335 B1 * | 3/2002 | Dawson ................ 714/39 |
| 7,050,395 B1 * | 5/2006 | Chow et al. ........... 370/231 |
| 2002/0138668 A1 * | 9/2002 | Heckel ................. 710/4 |
| 2003/0100961 A1 | 5/2003 | Monse et al. |
| 2005/0125501 A1 | 6/2005 | Inomoto et al. |

FOREIGN PATENT DOCUMENTS

| DE | 20201249 | 6/2003 |
| DE | 102 60 640 | 7/2004 |
| EP | 1 657 608 | 5/2006 |
| EP | 1659467 | 5/2006 |

\* cited by examiner

*Primary Examiner*—Thu Nguyen
*Assistant Examiner*—Patrick Vassall
(74) *Attorney, Agent, or Firm*—Kenyon & Kenyon LLP

(57) ABSTRACT

A method is provided for operating a field bus network system having a ring topology, which has a master unit and a plurality of slave units, which are connected by a field bus in a ring topology. The method includes transmission of a data message by the master unit to a slave unit intended for receiving the data message, which has a first counter device and a second counter device, a count of the first counter device being used to display a number of required relay steps via interposed slave units in the ring topology up to the slave unit intended for receiving the data message and a count of the second counter device being used to display a number of completed relay steps via interposed slave units in the ring topology; the slave units modifying the count of the first counter device using a first predefined algorithm upon receipt of the data message and ascertaining on the basis of the modified count of the first counter device whether it is the slave unit intended to receive the data message; and the slave units modifying the count of the second counter device using a second predefined algorithm upon receipt of the data message.

11 Claims, 3 Drawing Sheets

| T | TCU | | 10 | | 20 | | 30 | | 40 | |
|---|---|---|---|---|---|---|---|---|---|---|
| | 2 | 1 | 102 | 101 | 202 | 201 | 0 | 301 | 402 | 401 |
| S1 | X X | 4 0 | 4 0 | X X | X X | X X | X X | X X | X X | X X |
| S2 | X X | 3 0 | 3 0 | 3 1 | 3 1 | X X | X X | X X | X X | X X |
| S3 | X X | 2 0 | 2 0 | 2 1 | 2 1 | 2 2 | 2 2 | X X | X X | X X |
| S4 | X X | 1 0 | 1 0 | 1 1 | 1 1 | 1 2 | 1 2 | 1 3 | 1 3 | X X |
| S5 | 1 0 | 4 0 | 4 0 | 4 0 | 4 0 | 3 0 | 3 0 | 2 0 | 2 0 | 1 0 |
| S6 | 1 1 | 3 0 | 3 0 | 3 1 | 3 1 | 3 1 | 3 1 | 2 1 | 2 1 | 1 1 |
| S7 | 1 2 | 2 0 | 2 0 | 2 1 | 2 1 | 2 2 | 2 2 | 2 2 | 2 2 | 1 2 |
| S8 | 1 3 | 1 0 | 1 0 | 1 1 | 1 1 | 1 2 | 1 2 | 1 3 | 1 3 | 1 3 |
| S9 | 1 0 | 4 0 | 4 0 | 4 0 | 4 0 | 3 0 | 3 0 | 2 0 | 2 0 | 1 0 |
| S10 | 1 1 | 3 0 | 3 0 | 3 1 | 3 1 | 3 1 | 3 1 | 2 1 | 2 1 | 1 1 |
| S11 | 1 2 | 2 0 | 2 0 | 2 1 | 2 1 | 2 2 | 2 2 | 2 2 | 2 2 | 1 2 |
| S12 | 1 3 | 1 0 | 1 0 | 1 1 | 1 1 | 1 2 | 1 2 | 1 3 | 1 3 | 1 3 |

| T | TCU | | 10 | | 20 | | 30 | | 40 | |
|---|---|---|---|---|---|---|---|---|---|---|
| | 2 | 1 | 102 | 101 | 202 | 201 | 0 | 301 | 402 | 401 |
| S1 | X X | 4 0 | 4 0 | X X | X X | X X | X X | X X | X X | X X |
| S2 | X X | 3 0 | 3 0 | 3 1 | 3 1 | X X | X X | X X | X X | X X |
| S3 | X X | 2 0 | 2 0 | 2 1 | 2 1 | 2 2 | 2 2 | X X | X X | X X |
| S4 | X X | 1 0 | 1 0 | 1 1 | 1 1 | 1 2 | 1 2 | 1 3 | 1 3 | X X |
| S5 | 1 0 | 4 0 | 4 0 | 4 0 | 4 0 | 3 0 | 3 0 | 2 0 | 2 0 | 1 0 |
| S6 | 1 1 | 3 0 | 3 0 | 3 1 | 3 1 | 3 1 | 3 1 | 2 1 | 2 1 | 1 1 |
| S7 | 1 2 | 2 0 | 2 0 | 2 1 | 2 1 | 2 2 | 2 2 | 2 2 | 2 2 | 1 2 |
| S8 | 1 3 | 1 0 | 1 0 | 1 1 | 1 1 | 1 2 | 1 2 | 1 3 | 1 3 | 1 3 |
| S9 | 1 0 | 4 0 | 4 0 | 4 0 | 4 0 | 3 0 | 3 0 | 2 0 | 2 0 | 1 0 |
| S10 | 1 1 | 3 0 | 3 0 | 3 1 | 3 1 | 3 1 | 3 1 | 2 1 | 2 1 | 1 1 |
| S11 | 1 2 | 2 0 | 2 0 | 2 1 | 2 1 | 2 2 | 2 2 | 2 2 | 2 2 | 1 2 |
| S12 | 1 3 | 1 0 | 1 0 | 1 1 | 1 1 | 1 2 | 1 2 | 1 3 | 1 3 | 1 3 |

METHOD FOR OPERATING A FIELD BUS NETWORK SYSTEM HAVING A RING TOPOLOGY AND A CORRESPONDING FIELD BUS NETWORK SYSTEM

FIELD OF THE INVENTION

The present invention relates to a method for operating a field bus network system having a ring topology and a corresponding field bus network system.

BACKGROUND INFORMATION

A field bus is a communication system which connects multiple field devices, such as sensors and/or actuators, to one or more control units, which are used in motor vehicle technology, for example. The field bus technology was developed in the 1980s to replace parallel wiring of binary signals or analog signal transmission typical up to that point with digital transmission technology.

In a network, topology refers to the structure of the connections of multiple devices to one another to ensure mutual data exchange. In networking in a ring topology, each two users are connected to one another via two-point connections, so that a closed ring results. The information to be transmitted is relayed from user to user, until it has reached its intended location. Methods of addressing are required to ensure the communication.

In today's field bus systems, communication nodes are situated in a linear topology (frequently referred to as a bus) or in a star topology. For communication in these topologies, it is necessary that the communication nodes either have a unique identification in the form of a name or number or the messages carry a name or a number. In the second case, the communication nodes which wish to receive a specific message must know the name or the number of the message.

One conventional computer networking technology is token ring. In a token ring, the communication nodes are logically situated in a ring. Each node has an individual identification. A special node initiates the communication in the ring in that it relays a free token to its connected node. If the next node wishes to transmit something to another node, this node first appends the node number [of the node] to which it wishes to transmit, and subsequently its useful data. It now sets the token to the state "busy." It transmits the entire packet of the busy token, addresses, from where and to where, and the useful data one station further in the ring. The packet is relayed in the ring until the station having the correct node number receives the packet. This station receives the message and resets the token to "free." The token is relayed to the next station in the ring.

In current field bus systems, it is disadvantageously absolutely necessary for the communication nodes either to have a unique identification or for the nodes to know the identification of the messages which are of interest to the affected nodes. In novel mechatronic systems, the electronics are frequently distributed to the mechanical components. The distributed electronics exchange information with one another via a communication system (LIN, CAN, I2C . . . ). These distributed systems are to be producible as cost-effectively as possible. One possibility for this purpose is that the distributed electronics are identical parts which do not differ by differing identification. This is impossible to implement using the current communication systems.

German Patent Application No. DE 101 38 121 A1 describes an electronic system having a first bus system based on static addresses and a second bus system having addresses given dynamically during an initialization.

European Patent Application No. EP 1 659 467 A1 describes a method for operating a network having a ring topology, a faulty connection between two users of the network being recognized by monitoring a carrier signal.

SUMMARY

An example method according to the present invention for operating a field bus network system having a ring topology and/or the example field bus network system having a ring topology according to the present invention and/or an example master unit and/or an example slave unit according to an example embodiment of the present invention may have the advantage that identification of distributed electronics in a communication system is possible on the basis of the geographic position.

In accordance with example embodiments of the present invention, a single master system is provided having multiple slaves. The master and the slaves are arranged in a ring topology. The information to be transmitted is transmitted in messages. A message is always transmitted from one node to the next node until it reaches its target. Target addressing on the basis of the position is possible due to the structure of the message format. The difference from existing ring topologies is particularly in the message format. A message preferably includes a "start of frame" (SOF) sequence, a first counter of how many stations the message must pass, a second counter of how many stations the message has passed, useful data, data for error protection, and an "end of frame" (EOF) sequence.

Furthermore, it is preferable that the distributed electronics do not differ in the hardware and only perceive their specific task on the basis of the detected position in the system. Another advantage of example embodiments of the present invention is that a failure of the system or of its components is recognized very rapidly.

According to a preferred refinement, the slave unit intended to receive the data message ascertains, on the basis of the modified count of the first counter device and on the basis of the total number of slave units, at which position it is located in the field bus network system having a ring topology. The slave unit may perceive specific tasks using this knowledge.

According to a further preferred refinement, the total number of slave units is stored beforehand in the slave units.

According to a further preferred refinement, the total number of slave units is ascertained in an initialization phase, in that the master unit transmits a data message having a specific identifier and receives it after passage through the ring topology, each slave unit modifying the count of the second counter device using the second predefined algorithm and subsequently relaying it independently of the count of the first counter device; and after which the master unit transmits a data message to each individual slave unit, in which it communicates the ascertained total number of slave units.

According to a further preferred refinement, the total number of slave units is ascertained in an initialization phase, in that the master unit transmits a data message having a specific identifier and receives it after passage through the ring topology, each slave unit modifying the count of a third counter device of the data message using a predefined third algorithm and subsequently relaying it independently of the count of the first counter device; and after which the master unit transmits a data message to each individual slave unit, in which it communicates the ascertained total number of slave units.

According to a further preferred refinement, the slave unit intended to receive the data message transmits a message back to the master unit after receipt of the data message, such as an acknowledgment message or a data message or a combination thereof.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
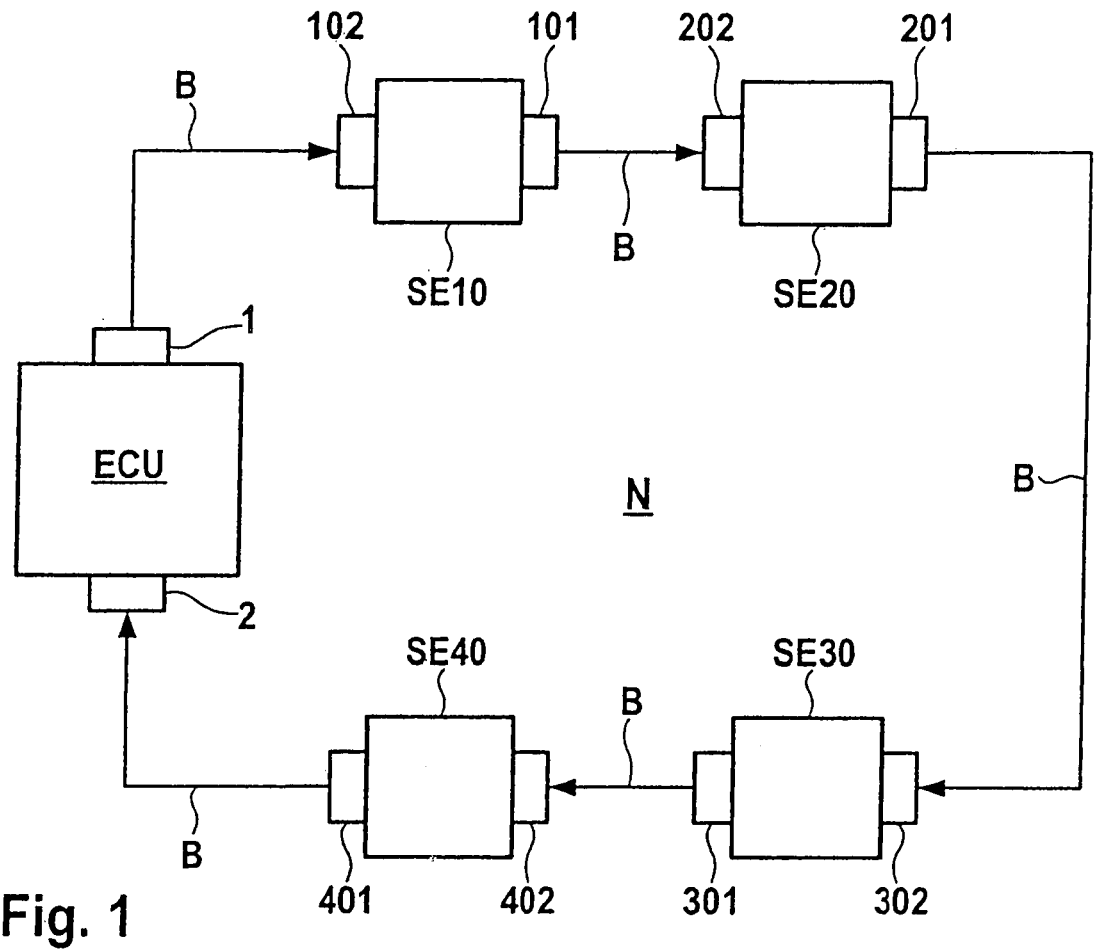
FIG. 1 schematically shows a field bus network system having a ring topology according to a first specific embodiment of the present invention.

FIG. 1 schematically shows a field bus network system N having a ring topology according to a first specific embodiment of the present invention.

In the example of FIG. 1, reference symbol ECU identifies a single master unit having an output register 1 and an input register 2.

Reference numerals SE10, SE20, SE30, SE40 identify first through fourth slave units, which are connected in a ring topology to master unit ECU. Reference numerals 101, 201, 301, 401 each identify an output register of the corresponding slave units SE10, SE20, SE30, SE40, and reference numerals 102, 202, 302, 402 each identify an input register of the corresponding slave units SE10, SE20, SE30, SE40. Reference numeral 1 identifies the output register of master unit ECU; reference numeral 2 identifies the input register of master unit ECU.

Reference symbol B identifies a field bus section, each of which connects one output and one input register of two slave units (SE10 and SE20, SE20 and SE30, SE30 and SE40) or of one slave unit and of master unit ECU (ECU and SE10, ECU and SE40). The arrows on field bus B identify the direction of the information transmission.

In the example of FIG. 1, master unit ECU controls the communication sequence. The number of slave units SE10, SE20, SE30, SE40, four here for example, is known to master unit ECU and slave units SE10, SE20, SE30, SE40 in this example, for example, by prior programming or DIP switch setting or by the system configuration per se.

Figure 2:
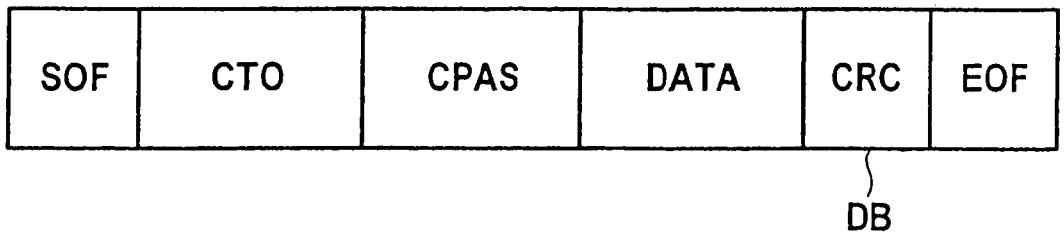
FIG. 2 shows an example of a message format for use in the first specific embodiment of the present invention according to FIG. 1.

FIG. 2 shows an example of a message format for use in the specific embodiment of the present invention of FIG. 1.

In this specific embodiment, a data message DB includes a "start of frame" sequence SOF, a first counter CTO (target counter), of how many stations data message DB must pass, a second counter CPAS (passing counter), of how many stations have been passed by data message DB, useful data DATA, data for error protection CRC, and an "end of frame" sequence EOF. The fields of data message DB, in particular the two counters, correspond to the register contents of the components of network N.

Figures 3, 5:
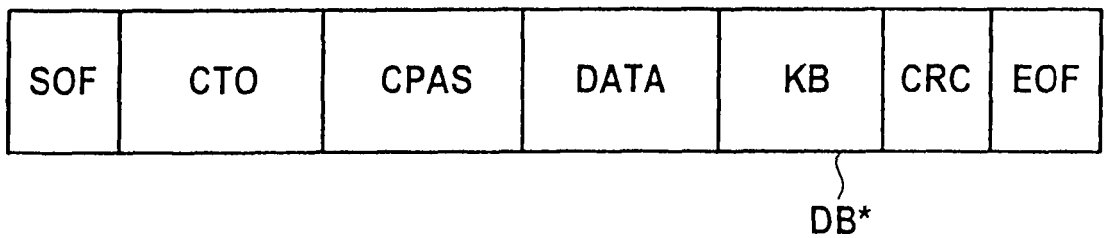
FIG. 3 shows an example of a communication matrix for the first specific embodiment of the present invention according to FIG. 1.
FIG. 5 shows a further example of a message format for use in a second specific embodiment of the present invention.

FIG. 3 shows an example of a communication matrix for the specific embodiment of the present invention according to FIG. 1.

The communication is initiated by master unit ECU in step S1 in that it transmits a data message DB having counter contents CTO=4 and CPAS=0 to first slave unit SE10. The first digit of the particular register of the corresponding unit represents the counter content of target counter CTO and the second digit represents the counter content of passing counter CPAS, i.e., the counter content in 1="4 0" in FIG. 3. "xx" means that the register in question is empty or undefined.

First slave unit SE10 receives this message, recognizes that this message is not intended for itself, decrements target counter CTO by one in step S2, increments passing counter CPAS by one and sends data message DB having counter contents "3 1" further to second slave unit SE20.

Second slave unit SE20 proceeds in the same way and transmits data message DB having counter contents "2 2" in step S3 further to third slave unit SE30. Third slave unit SE30 proceeds in the same way and transmits data message DB having counter contents "1 3" in step S4 further to fourth slave unit SE40. Fourth slave unit SE40 proceeds in the same way, and recognizes that data message DB is intended for itself, because decremented target counter CTO=0. Furthermore, fourth slave unit SE40 recognizes that passing counter CPAS=4 and therefore that it is itself at the fourth position in the field bus network system N having a ring topology. Fourth slave unit SE40 may analyze useful data DATA, which is intended for it.

In next step S5, fourth slave unit SE40 may transmit a data message DB having different or identical content to master unit ECU, it setting target counter CTO=1 and passing counter CPAS=0 for this purpose, after it has performed a corresponding target calculation based on the number of slave units (four) known to it and its position "four" detected by the numeric value "4" of the passing counter upon receipt of data message DB. Master unit ECU receives data message DB having counter contents "1 0" and may analyze useful data DATA.

As is also shown in from FIG. 3, because the transmission of data messages DB is always performed in steps, i.e., a data message DB is always transmitted from one node to the next node, multiple data messages DB may be transmitted in the ring at the same time. In the present case, master unit ECU always cyclically transmits one data message DB to fourth ("40"), third ("30"), second ("20"), and first ("10") slave unit, etc. The communication system may thus be utilized to 100%, and very high efficiency is thus ensured in comparison to typical bus systems (for example, CAN bus).

Master unit ECU may also determine in the system whether data messages DB have been lost. The requirement for this purpose is that each slave unit SE10, SE20, SE30, SE40, after receipt of a data message DB which is intended for it, transmits an acknowledgment data message DB back to master unit ECU, whereby the receipt of data message DB intended for it is confirmed. If this confirmation message does not appear, ECU may establish that an error has occurred after passage of a specific time, the maximum cycle duration. If slave units SE10, SE20, SE30, SE40 are to have various functionalities, acknowledgment data message DB may also contain a notification of the functionality of the relevant slave unit.

Although steps S1 through S12 in FIG. 3 are shown as sequential, further internal processing steps of the affected slave unit and master unit may also exist between each two steps, of course, as explained in the following with reference to FIG. 4.

Figure 4:
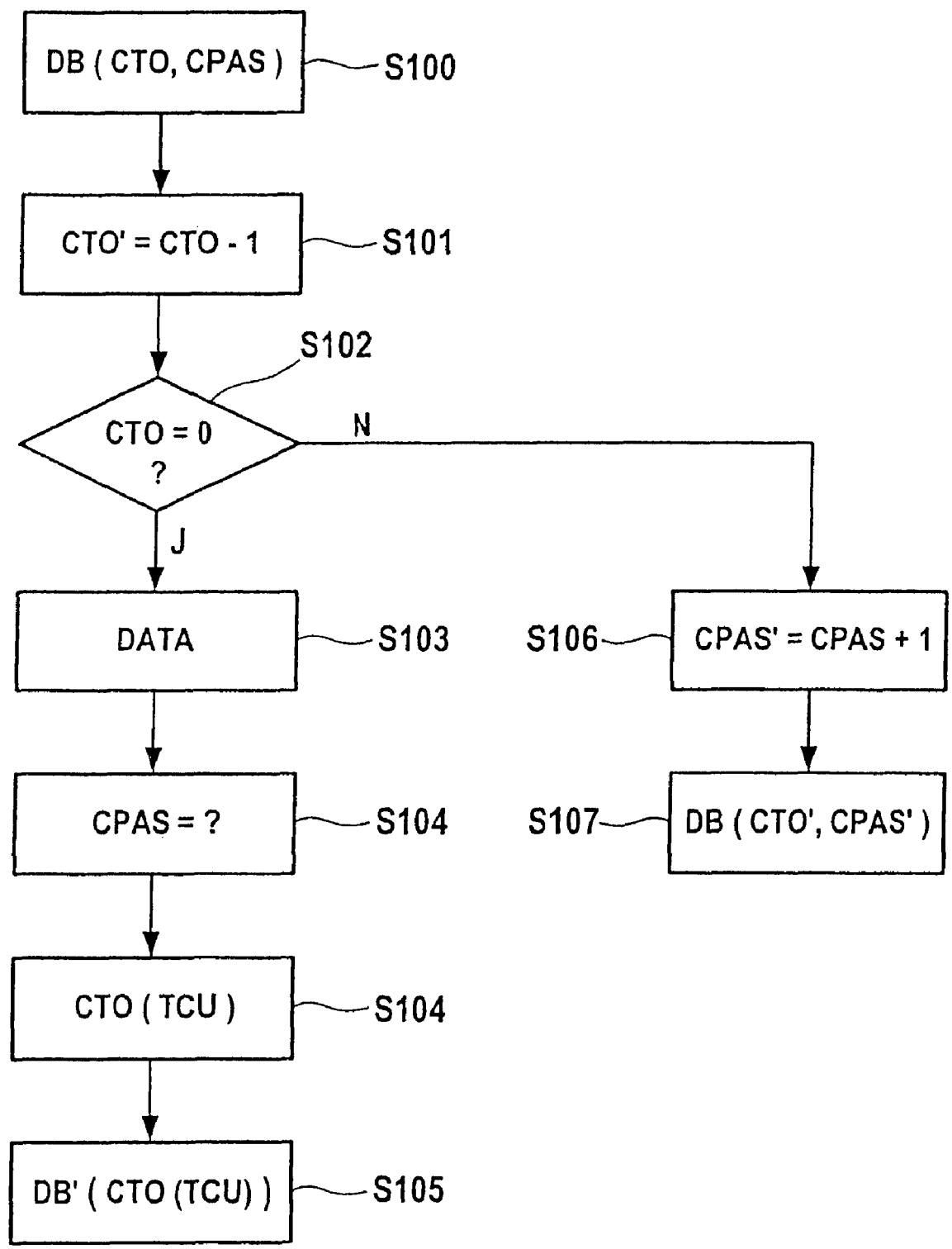
FIG. 4 shows a flow chart to explain the processing flow of the slave units in the first specific embodiment of the present invention according to FIG. 1.

FIG. 4 shows an exemplary flow chart to explain the processing flow of slave units SE10, SE20, SE30, SE40 in the embodiment of the present invention according to FIG. 1.

In step S100, a data message DB having counter contents CTO=x and CPAS=y is applied to the input register of the slave unit. In step S101, the slave unit decrements the count of target counter CTO by "1". In step S102, the slave unit checks whether the count of target counter CTO is equal to "0". If so, the slave unit reads useful data DATA intended for it in step S102. In step S104, the slave unit determines the count of passing counter CPAS and ascertains its position therefrom and from the known number of slave units, if this has not already been performed earlier. In step S104, the slave unit ascertains the target distance to the master unit for target counter CTO, if this has not already been performed earlier. In step S105, the slave unit transmits an (acknowledgment) data message DB' to master unit ECU.

If the result of the check in step S102 is negative, the slave unit increments the count of the passing counter by "1" in step S106 and transmits a data message DB having decremented target counter CTO' and incremented passing counter CPAS' to the following slave unit in step S107.

FIG. 5 shows a further example of a message format for use in a further embodiment of the present invention.

In a further example embodiment of the present invention, the number of communication nodes is unknown at the beginning of the communication to the nodes, i.e., to master unit ECU and slave units SE10, SE20, SE30, SE40. The difference from the first embodiment described above is that an additional bit or an identifier KB is provided in the format of data message DB*.

Master unit ECU sets this identifier KB in an initialization phase and transmits a data message DB* to the next node, slave unit SE10. The next node recognizes identifier KB and ignores addressing counter CTO, but increments passing counter CPAS and transmits the message further to the next node, etc. Data message DB* passes all nodes until it finally arrives at the original sender, master unit ECU. Master unit ECU now knows how many nodes there are in the system on the basis of the count of passing counter CPAS. This number may be communicated by a corresponding data message DB having unset identifier KB to all other nodes SE10, SE20, SE30, SE40. The communication may then be continued as in the first embodiment described above.

Although the present invention has been explained above on the basis of a preferred exemplary embodiment, it is not restricted thereto, but rather may also be implemented in other ways.

In particular, although arbitrary numbers of slave units and different formats of the data messages are possible, only the two counters CTO and CPAS are needed.

Although the passing counter was used to ascertain the number of nodes according to the example of FIG. 5, this may also be preformed by a further (third) counter device.

What is claimed is:

1. A method for operating a field bus network system having a ring topology, the system including a master unit and a plurality of slave units, which are connected by a field bus in a ring topology, the method comprising:

transmitting a data message by the master unit to a slave unit intended for receiving the data message, each of the plurality of slave units having a first counter device and a second counter device, a count of the first counter device being used to display a number of required relay steps via interposed slave units in the ring topology up to the slave unit intended for receiving the data message and a count of the second counter device being used to display a number of completed relay steps via interposed slave units in the ring topology;

modifying, by at least one of the slave units, the count of the first counter device using a first predefined algorithm upon receipt of the data message and ascertaining based on the modified count of the first counter device whether it is the slave unit intended to receive the data message; and modifying, by at least one of the slave units, the count of the second counter device using a second predefined algorithm upon receipt of the data message.

2. The method as recited in claim 1, wherein the slave unit intended to receive the data message ascertains, based on the modified count of the first counter device and on a total number of slave units, at which position it is located in the field bus network system having the ring topology.

3. The method as recited in claim 2, wherein the total number of slave units is stored beforehand in the slave units.

4. The method as recited in claim 2, wherein the total number of slave units is ascertained in an initialization phase, in that the master unit transmits a data message having a specific identifier and receives the data message having the specific identifier after passage through the ring topology, each of the slave units modifying the count of the second counter device using the predefined second algorithm and subsequently relaying it independently of the count of the first counter device; and after which the master unit transmits a data message to each of the individual slave units in which the ascertained total number of slave units is communicated.

5. The method as recited in claim 2, wherein the total number of slave units is ascertained in an initialization phase, in that the master unit transmits a data message having a specific identifier and receives the data message having the specific identifier after passage through the ring topology, each of the slave units modifying the count of a third counter device of the data message using a predefined third algorithm and subsequently relaying it independently of the count of the first counter device; and after which the master unit transmits a data message to each of the slave units, in which the ascertained total number of slave units is communicated.

6. The method as recited in claim 1, wherein the slave unit intended to receive the data message transmits back at least one of an acknowledgement message and data message to the master unit after receipt of the data message.

7. A field bus network system, comprising:

a master unit and a plurality of slave units connected by a field bus in a ring topology;

the master unit being adapted to transmit a data message to a slave unit intended to receive the data message, which has a first counter device and a second counter device, a count of the first counter device being used to display a number of required relay steps via interposed slave units in the ring topology up to the slave unit intended for receiving the data message and a count of the second counter device being used to display a number of completed relay steps via interposed slave units in the ring topology;

the slave units being adapted to modify the count of the first counter device using a predefined algorithm upon receipt of the data message and ascertain based on the modified count of the first counter device whether they are the slave unit intended to receive the data message; and the slave units further being adapted to modify the count of the second counter device using a predefined algorithm upon receipt of the data message.

8. The field bus network system as recited in claim 7, wherein the master unit and the slave units each have an input register and an output register for storing a data message to be received and a data message to be transmitted, and a control unit adapted to process the counts of the first and second counter devices.

9. A master unit for use in a field bus network system having a ring topology, the system including the master unit and a plurality of slave units, the master unit comprising:
a unit adapted to transmit a data message to a slave unit intended to receive the data message, which has a first counter device and a second counter device, a count of the first counter device being used to display a number of required relay steps via interposed slave units in the ring topology up to the slave unit intended for receiving the data message, and a count of the second counter device being used to display a number of completed relay steps via interposed slave units in the ring topology.

10. A slave unit for use in a field bus network system having a ring topology, the system including a master unit and a plurality of slave units, the slave unit comprising:
a unit adapted to receive, process, and relay a data message, which has a first counter device and a second counter device, a count of the first counter device being used to display a number of required relay steps via interposed slave units in the ring topology up to the slave unit intended for receiving the data message and a count of the second counter device being used to display a number of completed relay steps via interposed slave units in the ring topology, the processing including modification of the count of the first counter device using a predefined algorithm upon receipt of the data message and ascertainment based on the modified count of the first counter device whether it is the slave unit intended to receive the data message, the processing further including a modification of the count of the second counter device using a predefined algorithm upon receipt of the data message.

11. The slave unit as recited in claim 10, wherein the unit is adapted to ascertain, based on the modified count of the first counter device and on a total number of slave units, at which position it is located in the field bus network system having a ring topology.

* * * * *